United States Patent
Imamura

(10) Patent No.: US 7,877,574 B2
(45) Date of Patent: Jan. 25, 2011

(54) RELAY NODE COMMUNICATION INTERFACE TRANSMITTING UPDATE PACKET TO HIGHER NODE BY EXECUTING CHAIN INDIVISIBILITY INSTRUCTIONS UPON RECEIVING DATA CHANGE NOTIFICATION FROM LOWER NODE

(75) Inventor: Nobutaka Imamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/790,662

(22) Filed: Apr. 26, 2007

(65) Prior Publication Data

US 2007/0277019 A1    Nov. 29, 2007

(30) Foreign Application Priority Data

May 25, 2006    (JP) ............................. 2006-145924

(51) Int. Cl.
G06F 15/16    (2006.01)
(52) U.S. Cl. .......................................... 712/29; 712/28
(58) Field of Classification Search ........................ None
See application file for complete search history.

(56) References Cited

U.S. PATENT DOCUMENTS

| 6,675,178 | B1* | 1/2004 | Chinchar et al. ............ 707/201 |
| 7,490,077 | B2* | 2/2009 | Mourra et al. ................. 707/1 |
| 2005/0154791 | A1 | 7/2005 | Sutou |
| 2006/0224775 | A1* | 10/2006 | Lee et al. ..................... 709/248 |
| 2007/0255738 | A1* | 11/2007 | D'Costa ..................... 707/101 |

FOREIGN PATENT DOCUMENTS

| JP | 6-301650 A | 10/1994 |
| JP | 07-152640 | 6/1995 |
| JP | 7-200505 A | 8/1995 |
| JP | 9-10673 | 4/1997 |
| JP | 2000-285088 A | 10/2000 |
| JP | 2002-111774 A | 4/2002 |

OTHER PUBLICATIONS

Japanese Office Action mailed Aug. 3, 2010 in corresponding Japanese Patent Application 2006-145924.
Japanese Office Action mailed Nov. 2, 2010 in corresponding Japanese Patent Application 2006-145924.

* cited by examiner

*Primary Examiner*—Kenneth S Kim
(74) *Attorney, Agent, or Firm*—Staas & Halsey LLP

(57) ABSTRACT

A first storing unit stores therein a chain indivisibility instruction. A detecting unit detects a change of first data that is distributed in a node computer. A first designating unit designates, when the detecting unit detects the change in the first data, an indivisibility instruction corresponding to the first data from which the change is detected, by referring to the first storing unit. A first executing unit executes the indivisibility instruction designated by the first designating unit.

22 Claims, 14 Drawing Sheets

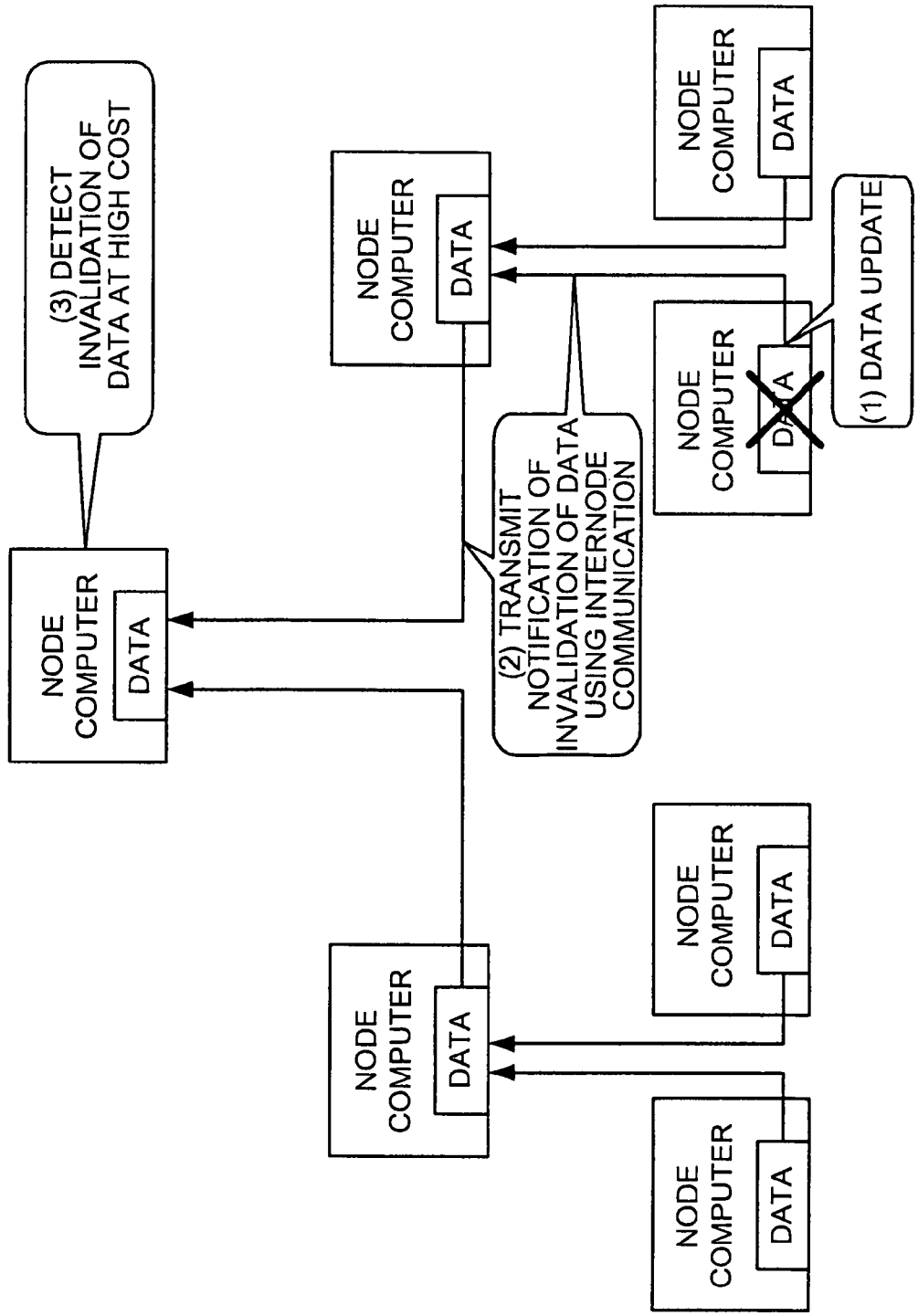

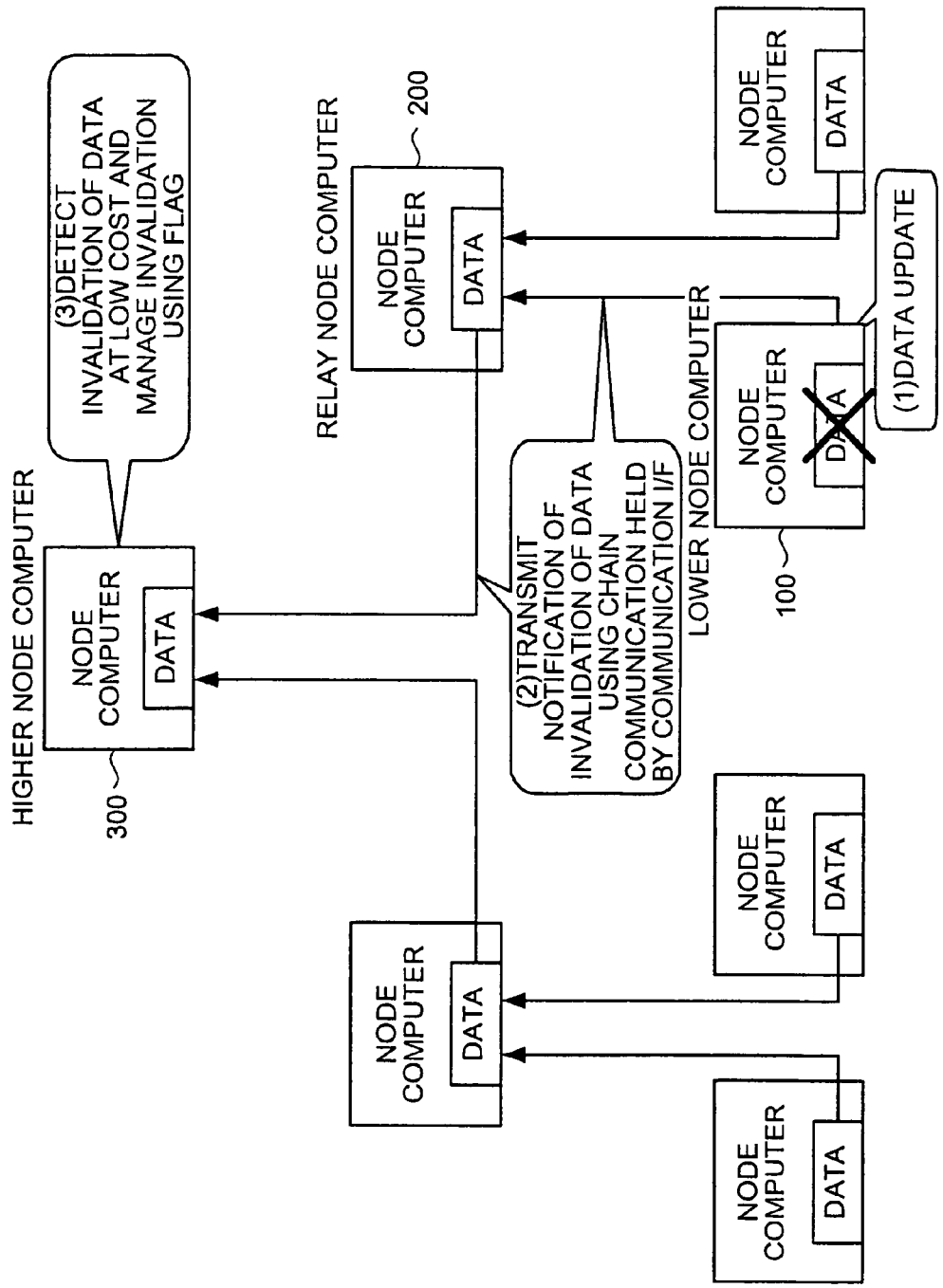

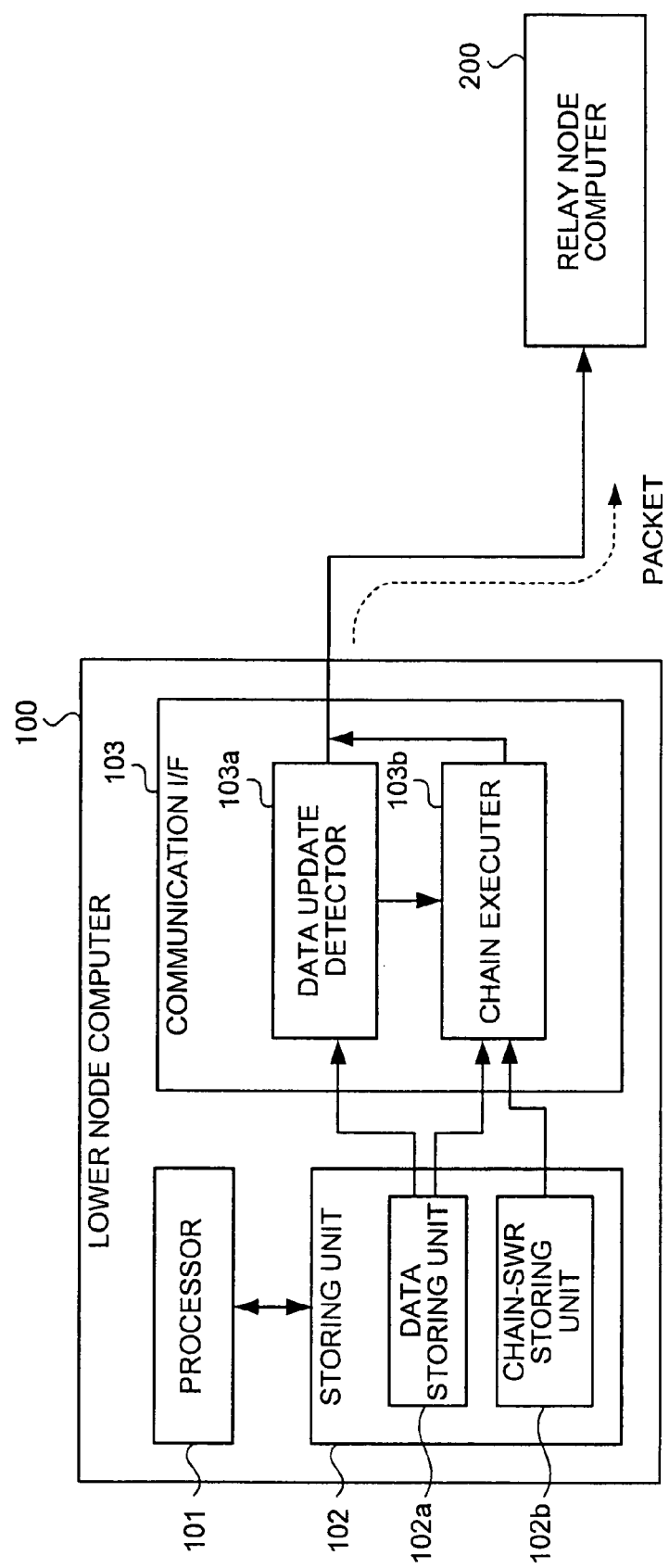

FIG.4

| ADDRESS | CONTENT OF STORAGE |
|---|---|
| ADDRESS 1 | POINTER INDICATING STORAGE AREA STORING TOP OF CHAIN SWR |
| ADDRESS 2 | DATA STORAGE AREA |
| . | . |
| . | . |
| . | . |
| ADDRESS $X_1$ | POINTER INDICATING DATA STORAGE AREA SWR1<br>POINTER INDICATING STORAGE AREA FOR NEXT CHAIN SWR |
| . | . |
| . | . |
| . | . |
| ADDRESS $X_2$ | POINTER INDICATING DATA STORAGE AREA SWR2<br>POINTER INDICATING STORAGE AREA IN NEXT CHAIN SWR |
| . | . |
| . | . |
| . | . |

DATA STORING UNIT

CHAIN SWR STORING UNIT

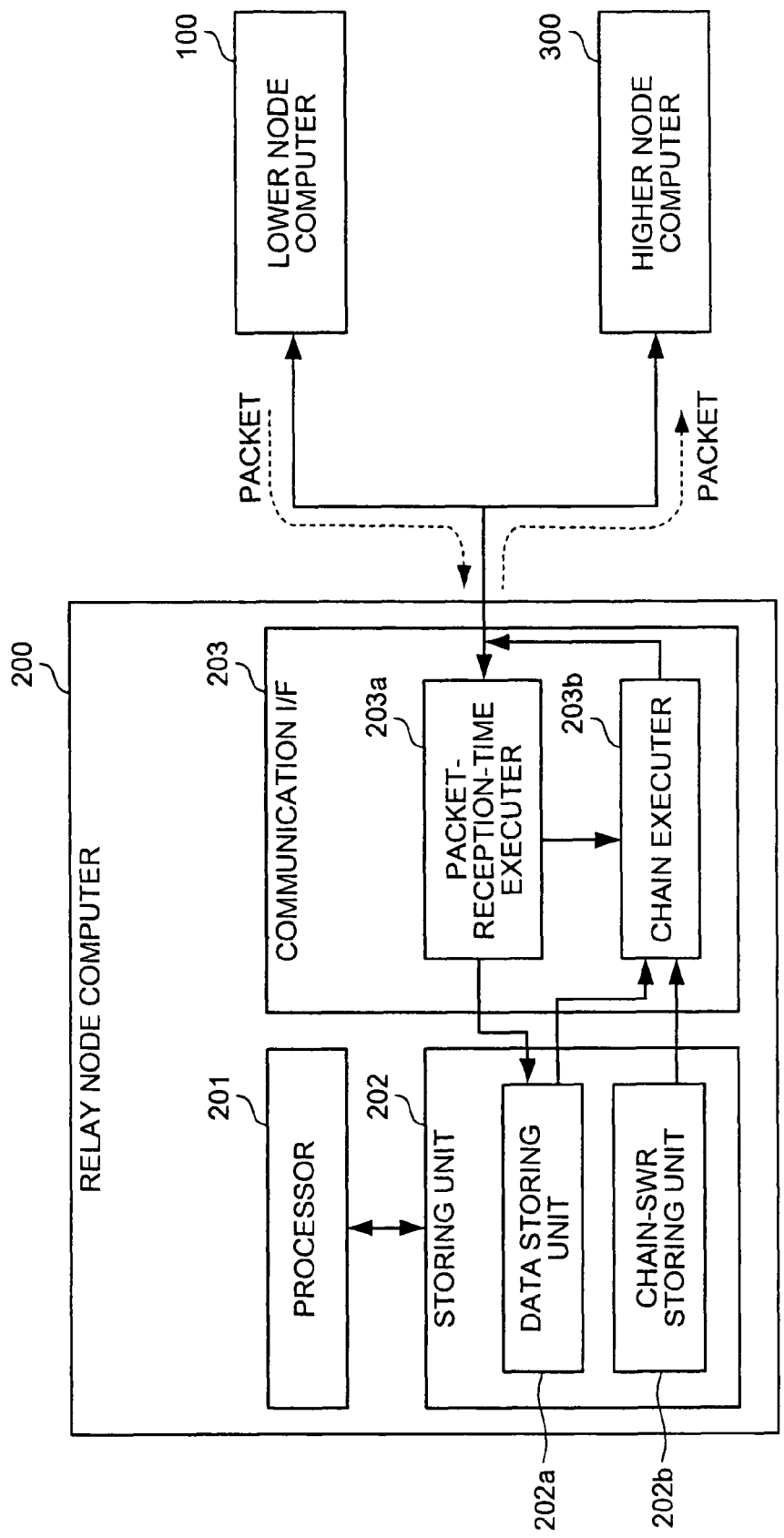

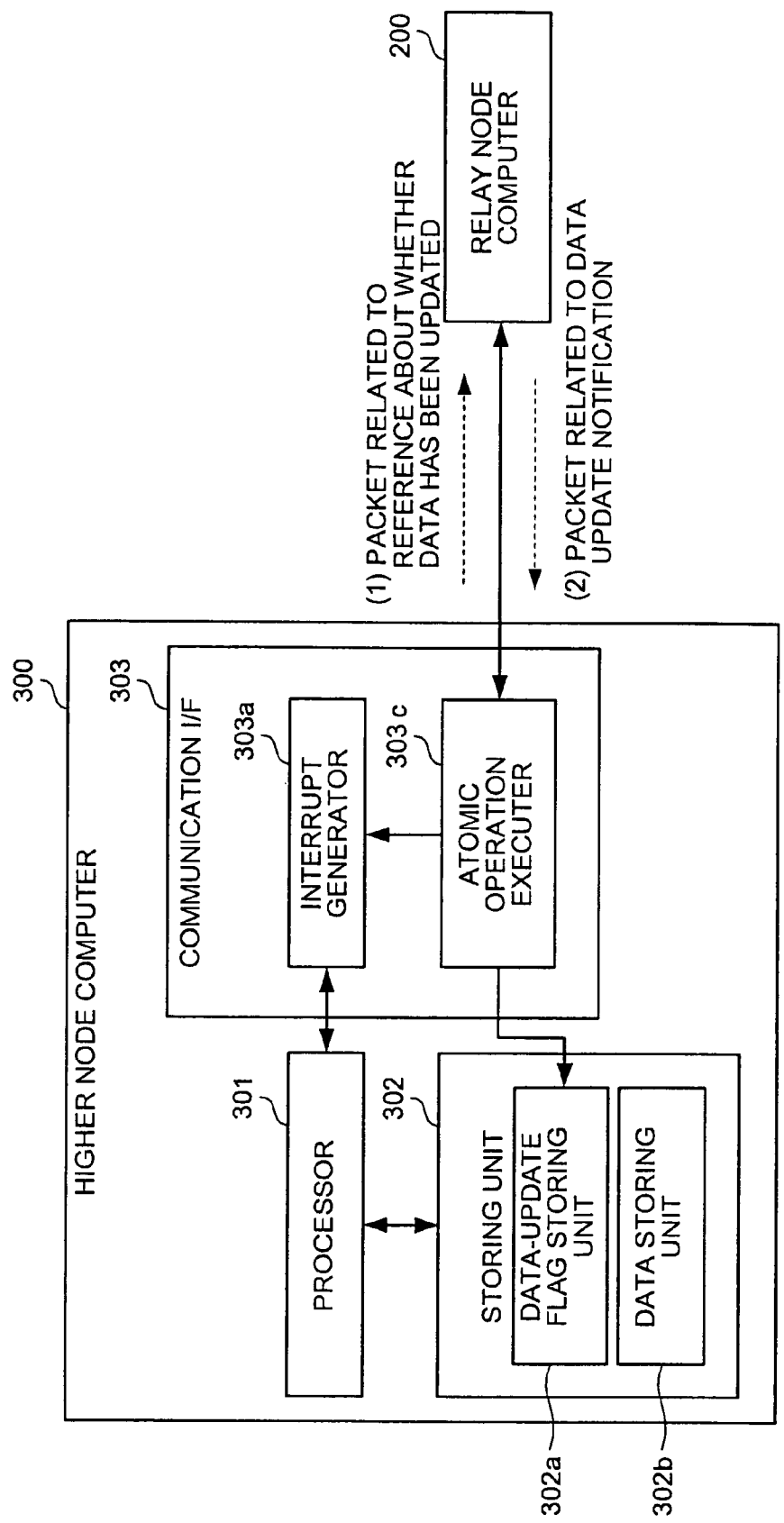

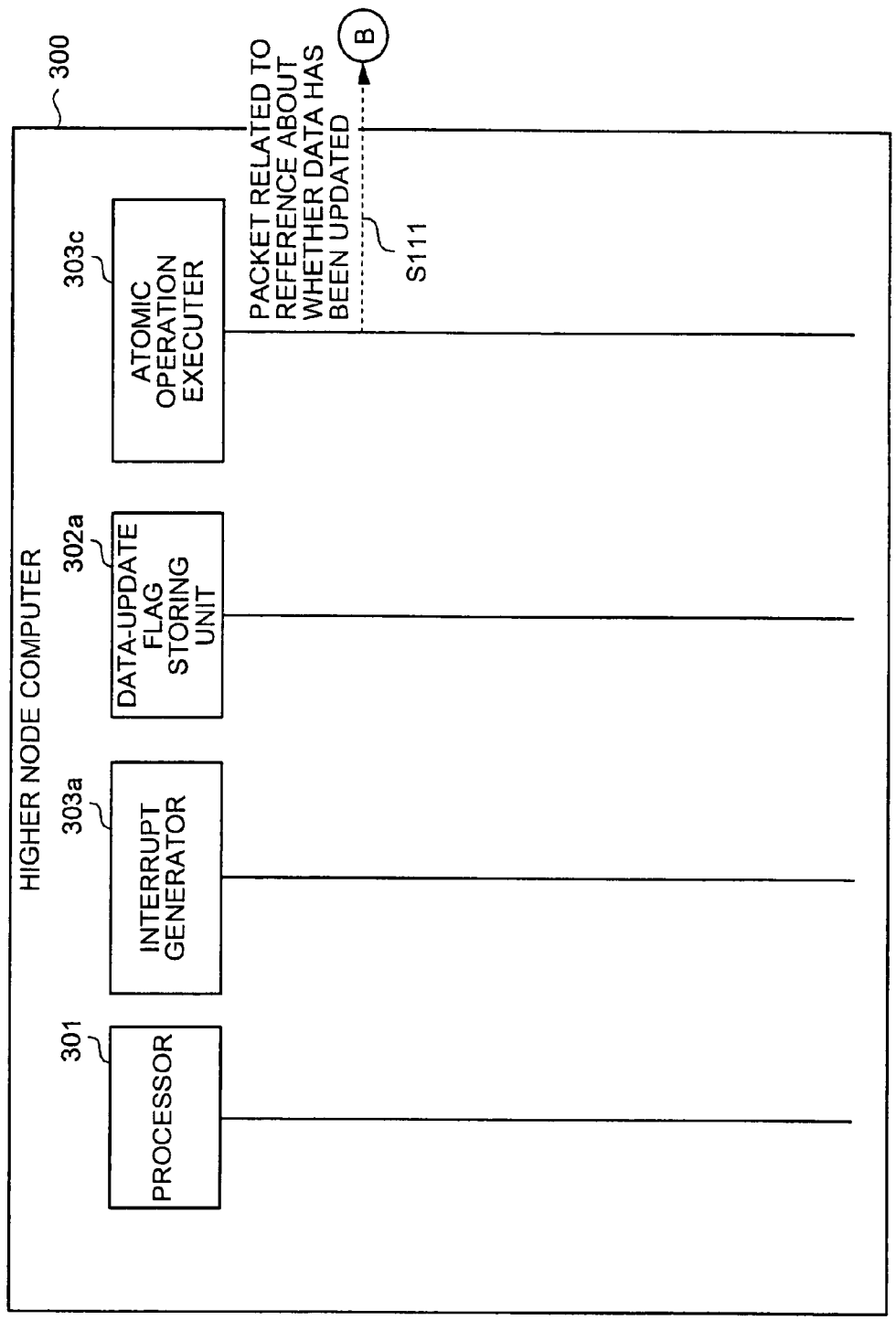

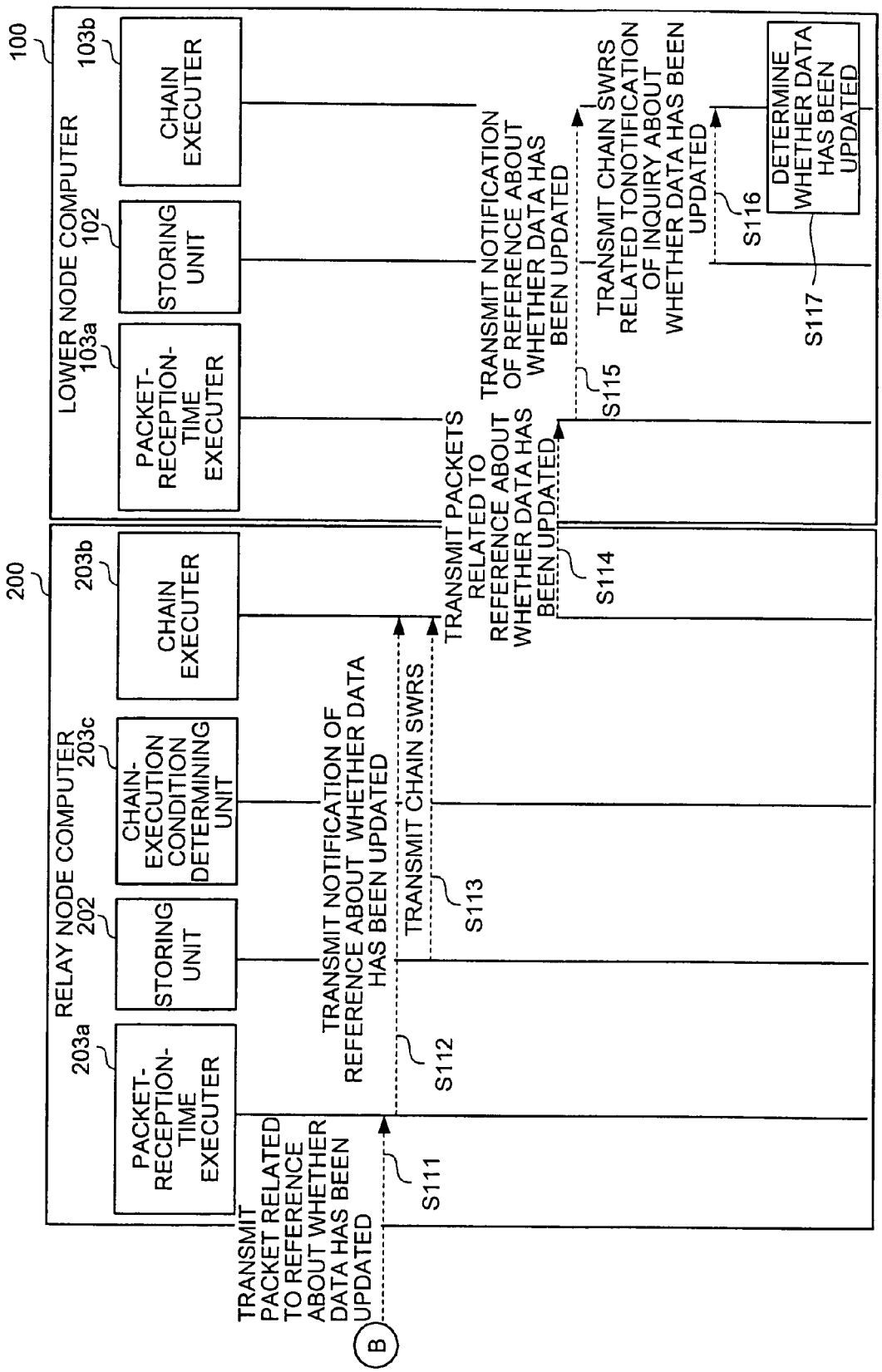

RELAY NODE COMMUNICATION INTERFACE TRANSMITTING UPDATE PACKET TO HIGHER NODE BY EXECUTING CHAIN INDIVISIBILITY INSTRUCTIONS UPON RECEIVING DATA CHANGE NOTIFICATION FROM LOWER NODE

CROSS REFERENCE TO RELATED APPLICATIONS

This application claims the benefit under 35 U.S.C. Section 119 of Japanese Patent Application No. 2006-145924, filed May 25, 2006, which is hereby incorporated by reference in it's entirety into this application.

BACKGROUND OF THE INVENTION

1. Field of the Invention

The present invention generally relates to a technology for transmitting information on a change of shared data to a higher node computer while suppressing an overhead in a parallel computer system having a multi-stage multi-branch tree structure.

2. Description of the Related Art

Conventionally, there has been known a technique for transmitting and receiving data among a plurality of computers using internode communication by connecting the computers to one another, and for sharing the data among the computers. It is important particularly for a parallel computer system, in which a plurality of computers is connected to one another to act as if the node computers operate as one computer to keep consistency of the shared data.

However, it is difficult to keep the consistency of the shared data through the communication held in the parallel computer system because of frequent communications and heavy overhead of a processor using a context switch for the communications.

To solve the disadvantages, the following parallel computer system is disclosed in, for example, Japanese Patent Application Laid-Open No. H7-152640. The parallel computer system includes a shared-data managing unit. In the parallel computer system, a computer that changes shared data present in a common memory notifies the shared-data managing unit of a change in the shared data. The shared managing unit manages the change in the shared data based on the notification. According to the technique disclosed in the Japanese Patent Application Laid-Open No. H7-152640, it is possible to keep consistency of the shared data in the parallel computer system by causing computers other than the computer that changes the shared data to refer to the change in the shared data managed by the shared-data managing unit. Furthermore, overhead can be suppressed in the parallel computer system and the consistency of the shared data can be kept by using the above mechanism.

The conventional technique disclosed in the Japanese Patent Application Laid-Open No. H7-152640 has, however, the following disadvantages. Differently from an instance in which shared data is stored in the shared memory, if data dependency relationship is held among a plurality of computers in the parallel computer system, a higher node computer cannot determine whether data input from a lower node computer has had change.

Specifically, the parallel computer system has a multi-branch tree structure with one node configuration/topology. Due to this, information on the change in shared data made by the lower node computer can be promptly transmitted to all the other node computers. However, if the parallel computer system has a multi-branch tree structure with multiple-node configuration/topology and data held in each node computer depends on data held in the lower node computers, it is actually, disadvantageously difficult to transmit information on the change in the shared data up to the highest node computer because of the restrictions imposed by communication overhead.

SUMMARY OF THE INVENTION

It is an object of the present invention to at least partially solve the problems in the conventional technology.

A communication interface device of a node computer in a parallel computer system, according to one aspect of the present invention, includes a first storing unit that stores therein a chain indivisibility instruction; a detecting unit that detects a change of first data that is distributed in the node computer; a first designating unit that designates, when the detecting unit detects the change in the first data, an indivisibility instruction corresponding to the first data from which the change is detected, by referring to the first storing unit; and a first executing unit that executes the indivisibility instruction designated by the first designating unit.

A communication method for a node computer in a parallel computer system, according to another aspect of the present invention, includes first storing including first storing; detecting a change of first data that is distributed in the node computer; first designating including designating, when the change in the first data is detected, an indivisibility instruction corresponding to the first data from which the change is detected, by referring to stored chain indivisibility instruction; and first executing including executing the indivisibility instruction designated at the first designating.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic for explaining disadvantages with a dependent-data match processing performed among node computers in a conventional parallel computer system;

FIG. 2 is a schematic for explaining features of a dependent-data match processing performed among node computers in a parallel computer system according to a first embodiment of the present invention;

FIG. 3 is a functional block diagram of a configuration of a lower node computer in the parallel computer system shown in FIG. 2;

FIG. 4 is a schematic for explaining contents of a storing unit included in each of the node computers shown in FIG. 2;

FIG. 5 is a functional block diagram of a configuration of a relay node computer in the parallel computer system shown in FIG. 2;

FIG. 12 is a functional block diagram of a configuration of a higher node computer in the parallel computer system shown in FIG. 9;

FIG. 13 is a first sequence chart of a dependent-data update/referring processing performed among the node computers in the parallel computer system shown in FIG. 9; and FIG. 14 is a second sequence chart of the dependent-data update/referring processing performed among the node computers in the parallel computer system shown in FIG. 9.

DETAILED DESCRIPTION OF THE PREFERRED EMBODIMENTS

Figure 6:
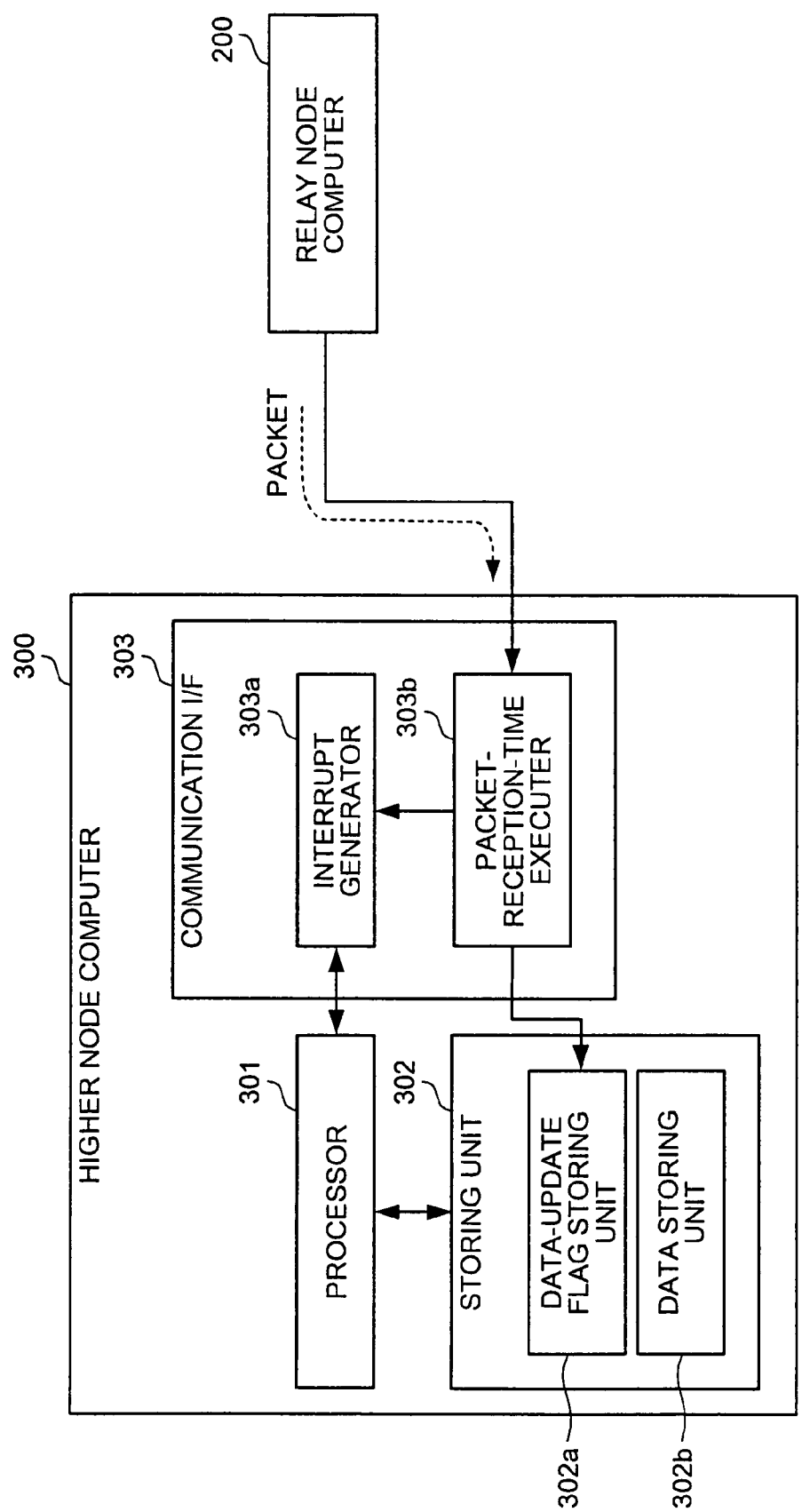
FIG. 6 is a functional block diagram of a configuration of a higher node computer in the parallel computer system shown in FIG. 2.

Exemplary embodiments of the present invention will be explained in detail below with reference to the accompanying drawings. According to the embodiments, instances of applying the present invention to a processing related to consistency of a plurality of dependent data (hereinafter, "dependent-data match processing") in a parallel computer system will be explained. The parallel computer system is configured so that a plurality of node computers is connected to one another to perform parallel applications, and the dependent data is arranged to be distributed to the respective node computers. Among the data, the data arranged in a higher node computer depends on that arranged in a lower node computer. Examples of the parallel computer system according to the embodiments of the present invention widely include various computers such as a cluster computer and a grid computer. Furthermore, a communication interface device according to the embodiments of the present invention is based on remote direct memory access (RDMA), which is a scheme for direct access from a remote computer to a memory, represented by InfiniBand and Myrinet (registered trademarks) as interface standards for the node computers in the parallel computer system.

The dependent-data match processing according to a first embodiment will be explained. A plurality of data is arranged to be distributed to each of the node computers in a parallel computer system, and has a dependency relationship with one another in a multi-tree structure. In the dependent-data match processing according to the first embodiment, a notification indicating the update of data arranged in a lower node computer is transmitted to a higher node computer to recalculate data that is arranged in the higher node computer and that depends on the data arranged in the lower node computer whenever data is updated in the lower node computer.

Prior to the dependent-data match processing according to the first embodiment, disadvantages with the dependent-data match processing performed among node computers in a conventional parallel computer system will be explained with reference to FIG. 1. As shown in FIG. 1, data arranged in a highest node computer depends on data arranged in relay node computers arranged adjacent to the highest node computer under the tree-structure dependency relationship. The data arranged in each of the relay node computers depends on data arranged in lower node computers arranged adjacent to each of the relay node computers under the tree-structure dependency relationship. Namely, the data arranged in the higher node computer depends on the data arranged in the lower node computers.

It is assumed that the data is updated in one of the lowest node computers as shown in (1) of FIG. 1. The data arranged in the relay node computer adjacent to the lowest node computer depends on the data arranged in the lowest node computer. The lowest node computer transmits a notification indicating invalidation of the data accompanying the data update in the lowest node computer to the higher relay node computer adjacent to the lowest node computer using an internode communication as shown in (2) of FIG. 2. The relay node computer recalculates and updates the data arranged therein based on the data updated in the lowest node computer.

Furthermore, the data arranged in the highest node computer adjacent to the relay node computer depends on the data arranged in the relay node computer. The relay node computer transmits a notification indicating invalidation of the data accompanying the data update in the relay node computer to the highest node computer using the internode communication as shown in (2) of FIG. 1. The highest node computer, therefore, detects the data update shown in (1) of FIG. 1 and the invalidation of the data shown in (2) of FIG. 1 at "high cost" as shown in (3) of FIG. 1.

The meaning of the "high cost" is as follows. The notification indicating the invalidation of dependent data arranged to be distributed in the parallel computer system is transmitted from the lower node computer to the higher node computer using the internode communication. The internode communication has, however, the following drawbacks. An interrupt occurs in a processor of each of the node computers whenever a packet is transmitted or received, and a standby processing for receiving the packet provokes a disturbance in a context switch of the processor. As a result, a communication rate at which the node computers communicate with one another is decelerated.

If the node computers in the parallel computer system hold communication using the internode communication while the node computers have, in particular, the dependency relationship of data in the multi-tree structure/topology, overhead is generated. Specifically, the overhead is generated when the lowest node computer transmits the notification indicating the invalidation of the data accompanying the data update to the highest node computer via a plurality of relay node computers using the internode communication. The overhead causes deceleration of the communication rate at which the node computers communicate with one another and eventually deteriorates improvement of performances of the parallel computer system. This situation is expressed as the "high cost".

The present invention has been achieved to solve the conventional disadvantages. According to the first embodiment, it is possible to efficiently transmit the notification indicating the invalidation of the data accompanying the update of the data arranged to be distributed in the respective node computers that have the data dependency relationship in the multiple-tree structure/topology in the parallel computer system without an interrupt in the processor of each of the node computers and a disturbance in the context switch of the processor.

The dependent-data match processing performed among the node computers in the parallel computer system according to the first embodiment will be explained with reference to FIG. 2. In FIG. 2, a lower node computer 100 serves as a lowest node computer, a relay node computer 200 serves as a relay node computer, and a higher node computer 300 serves as a highest node computer. The respective node computers in the parallel computer system shown in FIG. 2 have the data dependency relationship with one another in the multi-tree structure.

In FIG. 2, similarly to FIG. 1, data arranged in the higher node computer 300 depends on data arranged in the relay node computer 200 adjacent to the higher node computer 300 under the dependency relationship in the multi-tree structure. The data arranged in the relay node computer 200 depends on data arranged in the lower node computer 100 adjacent to the relay node computer 200 under the dependency relationship in the multi-tree structure. Namely, the data arranged in the higher node computer 300 depends on the data arranged in the relay node computer 200 and the lower node computer 100 that are lower than the higher node computer 300.

It is assumed that the data is updated in the lower node computer 100 at a lowest level as shown in (1) of FIG. 2. The data arranged in the relay node computer 200 adjacent to the lower node computer 100 depends on the data arranged in the lower node computer 100. The lower node computer 100 transmits a notification indicating invalidation of the data accompanying the data update in the lower node computer 100 to the relay node computer 200 adjacent to the lower node computer 100 using a chain communication held by a communication interface (I/F) included in each of the node computers as shown in (2) of FIG. 2. The relay node computer 200 recalculates and updates the data arranged therein based on the data updated in the lower node computer 100.

Furthermore, the data arranged in the higher node computer 300 adjacent to the relay node computer 200 depends on the data arranged in the relay node computer 200. If the data is updated and thereby invalidated in the relay node computer 200, the relay node computer 200 transmits a notification indicating invalidation of the data accompanying the data update in the relay node computer 200 to the higher node computer 300 using the chain communication held by the communication I/F included in each of the node computers as shown in (2) of FIG. 2. The higher node computer 300 located at the highest level, therefore, detects the data update shown in (1) of FIG. 2 and the invalidation of the data shown in (2) of FIG. 2 at "low cost" and manages the update using a flag as shown in (3) of FIG. 2.

The meaning of the "low cost" is as follows. According to the first embodiment, the notification indicating the update of the dependent data is transmitted from the lower node computer to the higher node computer arranged to be distributed in the parallel computer system using the chain communication held by the communication I/F included in each of the node computers.

If the node computers in the parallel computer system hold communication using the chain communication held by the communication I/F included in each node computer, even when the node computers have the dependency relationship of data in the multi-tree structure/topology, overhead can be suppressed. As explained, the overhead is generated when the lowest node computer transmits the notification indicating the invalidation of the data accompanying the data update to the highest node computer via a plurality of relay node computers.

If the internode communication is used to transmit the notification indicating the invalidation of the data accompanying the data update, then an interrupt occurs in a processor of each of the node computers whenever a packet is transmitted or received and the standby processing for receiving the packet provokes a disturbance in a context switch of the processor. This causes deceleration of a communication rate at which the node computers communicate with one another. According to the first embodiment, the internode communication is not used, so that these disadvantages do not occur. It is, therefore, possible to prevent deterioration in performances of the parallel computer system and make most use of the performances of the parallel computer system without decelerating the communication rate at which the node computers hold communication with one another. This situation is expressed as the "low cost".

A configuration of the lower node computer 100 in the parallel computer system shown in FIG. 2 will be explained with reference to FIG. 3. The lower node computer 100, the relay node computer 200, and the higher node computer 300 include identical functional blocks. Functional blocks other than those characteristic of the lower node computer 100 shown in FIG. 3 will not be explained herein. As shown in FIG. 3, the lower node computer 100 includes a processor 101 that controls entirety of the lower node computer 100, a storing unit 102, and a communication I/F 103 that is a network interface card.

The storing unit 102 includes a data storing unit 102a such as a memory that is a storage area for storing data, and a chain send-work-request (SWR) storing unit 102b that stores therein chain SWRs. The SWR means an instruction to transmit a packet to an outside. A packet is transmitted to the outside based in response to the SWR. The chain SWRs are a group of the SWRs associated with one another in order. If the chain SWRs are output, all the associated SWRs are output in order. A packet in response to each of the output SWRs is transmitted to the outside.

According to the first embodiment, the packet transmitted or received includes data on which a corresponding atomic operation is executed and pointer information indicating addresses where the chain SWRs to be executed are stored in the chain-SWR storing unit 102b. The data storing unit 102a stores therein not only the data on which the corresponding atomic operation is performed but also the pointer information indicating a top address of the addresses where the chain SWRs to be executed are stored in the chain-SWR storing unit 102b.

The communication I/F 103 includes a data update detector 103a and a chain executer 103b. The data update detector 103a detects update of update-detection target data stored in the data storing unit 102a.

If the chain executer 103b is notified of the detection of the data update by the data update detector 103a, the chain executer 103b reads the pointer information indicating the top address of the addresses where the chain SWRs to be executed are stored from the data storing unit 102a. Furthermore, the chain executer 103b reads a first SWR stored at an address indicated by the pointer information and executes an atomic operation. Next, the chain executer 103b reads a second SWR to be transmitted subsequently to the first SWR stored in the chain-SWR storing unit 102b from the pointer information indicating an address where the second SWR is stored, and executes a corresponding atomic operation. Chain processings are repeated as long as the pointer information indicating an address where a SWR to be transmitted next is stored, is stored. As a consequence, if one packet is received from the outside, then the chain SWRs are sequentially read by functions of the communication I/F 103, the corresponding atomic operations are executed, and the corresponding packets are transmitted.

In this way, the lower node computer 100 transmits the packets to the relay node computer 200 according to the update of the update-detection target data stored in the data storing unit 102a.

Contents of the storing unit 102 included in each of the node computers will be explained with reference to FIG. 4. In FIG. 4, the contents of the storing unit 102 included in the lower node computer 100 are shown.

As shown in FIG. 4, the storing unit 102 stores therein a pointer indicating a top storage area for the chain SWRs at an address 1. Specifically, the information indicated by this pointer is an address $X_1$. The storing unit 102 stores therein SWR-related data at an address 2. Storage areas indicated by the addresses 1 and 2 are present in the data storing unit 102a.

At the address $X_1$, the pointer of the data storage area (i.e., the address 2), the SWR1 in the chain SWRs, and the pointer of the storage area (i.e., an address $X_2$) in which the SWR2 subsequent to the SWR1 is stored are stored. Likewise, at the address $X_2$, the pointer of the data storage area (i.e., the address 2), the SWR2 in the chain SWRs, and the pointer of the storage area in which a SWR3 subsequent to the SWR2 is stored are stored. In this manner, all the chain SWRs are stored to be accompanied by pointers indicating the storage areas of the respective SWRs which are to be read next and on which corresponding atomic operations are executed. It is to be noted that storage areas indicated by the addresses $X_1$, addresses $X_2$, . . . are present in the chain-SWR storing unit 102b.

The data update detector 103a designates an address of a memory area for which an operation is designated using an actual address. The chain executer 103b transmits a corresponding packet to the other node computer based on an instruction to transmit the packet to the other node computer.

A configuration of the relay node computer 200 in the parallel computer system shown in FIG. 2 will be explained with reference to FIG. 5. Functional blocks other than those characteristic of the relay node computer 200 shown in FIG. 5 will not be explained herein. As shown in FIG. 5, the relay node computer 200 includes a processor 201 that controls entirety of the relay node computer 200 and that performs processings and calculations, a storing unit 202, and a communication I/F 203 that is a network interface card.

The storing unit 202 includes a data storing unit 202a such as a memory that is a storage area for storing data, and a chain-SWR storing unit 202b that stores therein chain SWRs. The data storing unit 202a and the chain-SWR storing unit 202b function similarly to the data storing unit 102a and the chain-SWR storing unit 102b.

The communication I/F 203 includes a packet-reception-time executer 203a and a chain executer 203b. Upon reception of a packet, the packet-reception-time executer 203a executes a memory operation corresponding to the received packet in the data storing unit 202a, and instructs the chain executer 203b to execute chain atomic operations.

If the chain executer 203b is instructed to execute chain atomic operations by the packet-reception-time executer 203a, the chain executer 203b reads the pointer information indicating the top address of the addresses where the chain SWRs to be executed are stored, from the data storing unit 202a. Furthermore, the chain executer 203b reads the first SWR stored at the address indicated by the pointer and executes a corresponding atomic operation. Next, the chain executer 203b reads the second SWR from the pointer indicating the address where the second SWR to be executed next to the first SWR is stored, is stored to accompany the first SWR stored in the chain-SWR storing unit 202b, and executes a corresponding atomic operation. The chain processings are repeated as long as the pointer information indicating an address where an SWR to be executed next is stored, is stored. As a consequence, if one packet is received from the outside, then the chain SWRs is sequentially read by functions of the communication I/F 203, and the corresponding atomic operations are executed.

Specifically, in response to reception of the packet from the lower node computer 100, the chain SWRs are output, and the packets corresponding to each of the SWRs are transmitted to the outside of the relay node computer 200 such as the higher node computer 300.

It is to be noted that the packet-reception-time executer 203a can receive not only packets from the other node computer, but also those from the relay node computer 200 including the packet-reception-time executer 203a. This is based on the fact that the packet-reception-time executer 203a can transmit packets to the relay node computer 200.

Furthermore, the address of the memory area for which the operation is designated by the received packet is a virtual address. The communication I/F 203, therefore, includes a function of converting the virtual address into an actual address. The packet-reception-time executer 203a outputs an instruction to cause the chain executer 203b to execute chain processings related to the data reception, to the chain executer 203b. The chain executer 203b transmits a corresponding packet to the other node computer in response to the instruction to transmit the packet to the other node computer.

A configuration of the higher node computer 300 in the parallel computer system shown in FIG. 2 will be explained with reference to FIG. 6. Functional blocks other than those characteristic of the higher node computer 300 shown in FIG. 6 will not be explained herein.

As shown in FIG. 6, the higher node computer 300 includes a processor 301 such as a CPU, a storing unit 302 such as a memory, and a communication I/F 303 that is a network interface card. The storing unit 302 includes a data-update-flag storing unit 302a that stores therein the notification indicating the update of data in the lower node computer 100 or the relay node computer 200 using a data-update flag, and a data storing unit 302b that is an area in which data including a received packet is written. The communication I/F 303 includes an interrupt generator 303a and a packet-reception-time executer 303b.

The interrupt generator 303a generates an interrupt or an event in the processor 301 based on an interrupt-processing generation instruction from the packet-reception-time executer 303b. Upon reception of a packet from the other node computer, the packet-reception-time executer 303b executes an atomic operation corresponding to the received packet and directly performs a memory operation in the data storing unit 202a. Specifically, the packet-reception-time executer 303b turns on the data-update flag in the data-update-flag storing unit 302a.

It is to be noted that the packet-reception-time executer 303b can receive not only packets from the other node computer, but also those from the higher node computer 300 including the packet-reception-time executer 303b. This is based on the fact that the packet-reception-time executer 303b can transmit packets to the higher node computer 300.

Furthermore, the address of the memory area for which the operation is designated by the received packet is a virtual address. The communication I/F 303, therefore, includes a function of converting the virtual address into an actual address. The packet-reception-time executer 303b outputs an instruction to cause the interrupt generator 303a to generate an interrupt processing related to the data reception, to the interrupt generator 303a.

In this manner, in the lower node computer 100, the relay node computer 200, and the higher node computer 300 according to the first embodiment, a transmission processing for transmitting the notification indicating the update of data under the dependency relationship in the lower node computer 100 to the higher node computer 300 via the relay node computer 200 is performed only using the communication I/Fs 103, 203, and 303. Conventionally, the transmission processing is performed by the processors 101, 201, and 301. Therefore, according to the first embodiment, it is possible to suppress a disturbance in the context switch of each processor caused by the interrupt generated whenever a packet is received and by a synchronous processing. Namely, according to the first embodiment, the generation of the interrupt whenever a packet related to the transmission processing is received can be suppressed, and the transmission processing is handed over from software control performed by each processor to a hardware processing performed by each communication I/F. It is, therefore, possible to suppress the disturbance in the context switch of each processor, increase the communication rate at which the node computers communicate with one another in the parallel computer system, and improve processing capabilities of the parallel computer system.

According to the first embodiment, a data cache mechanism for chaining consistency of the data under the dependency relationship among the node computers of the parallel computer system can be realized. Namely, the node computers have the data dependency relationship, mutually hold data caches, and can automatically recognize the consistency of the cached data using the respective communication I/Fs.

If an attention is paid to the characteristic features of distributed applications in the parallel computer system, it is conventionally necessary to perform the same recalculation despite no change in input. If the data dependency relationship is held in the multi-tree structure, it is unnecessary to perform the same recalculation as long as input data is not updated. Nevertheless, it is conventionally difficult to recognize whether the input data is updated at a final data output side so as to cancel the same recalculation. According to the first embodiment, it is advantageously easy to recognize whether the input data is updated at the final data output side.

If the notification indicating the update of the input data is transmitted from the lower node computer 100 eventually to the higher node computer 300, the higher node computer 300 pays attention to use of the data dependent on the input data. Alternatively, updated new data can be transmitted to the higher node computer 300 together with the notification indicating the update of the input data, and the higher node computer 300 can recalculate the data based on the update of the input data.

Figure 7:
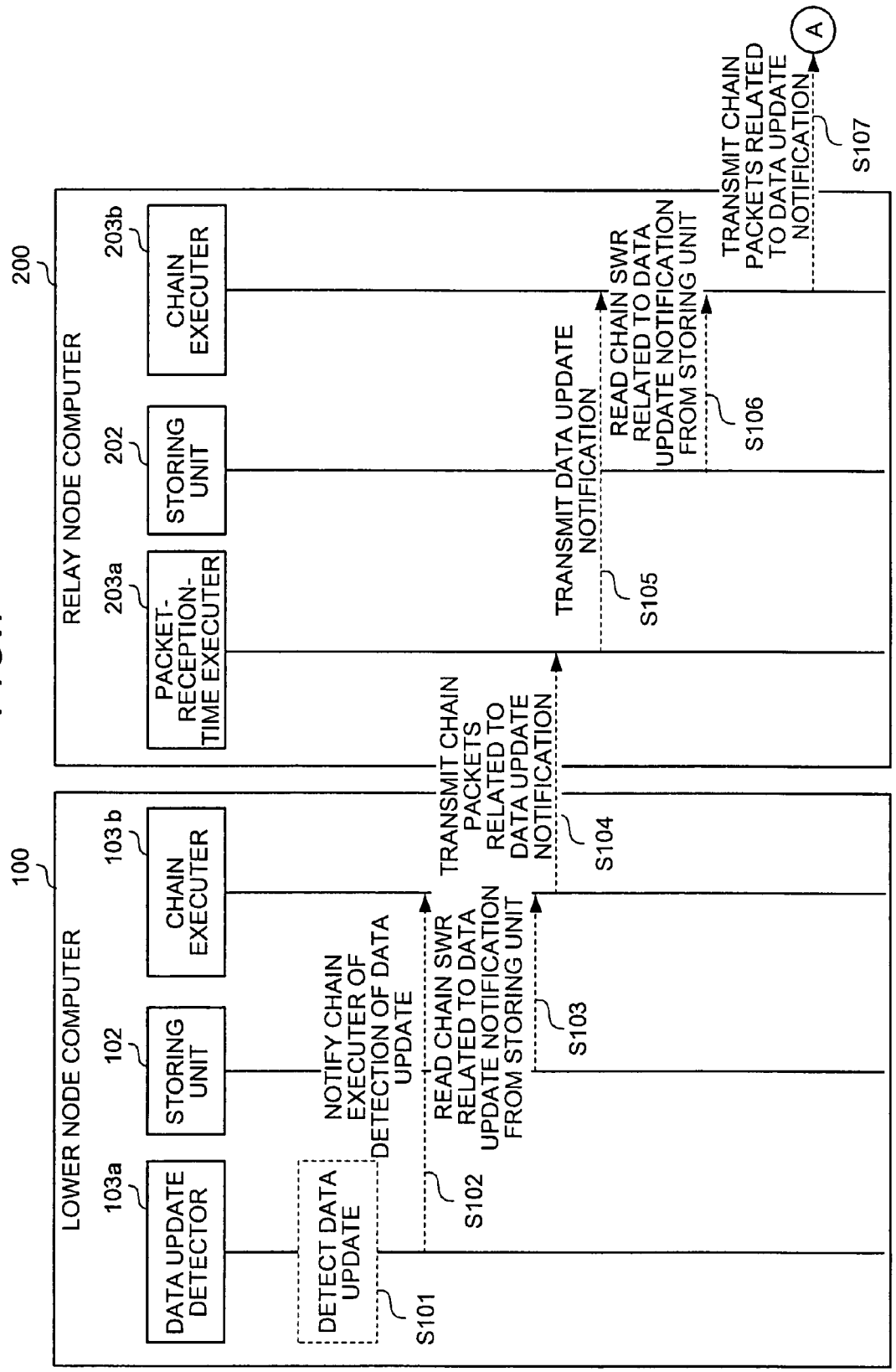
FIG. 7 is a first sequence chart of a dependent-data match processing performed among the node computers in the parallel computer system shown in FIG. 2.
Figure 8:
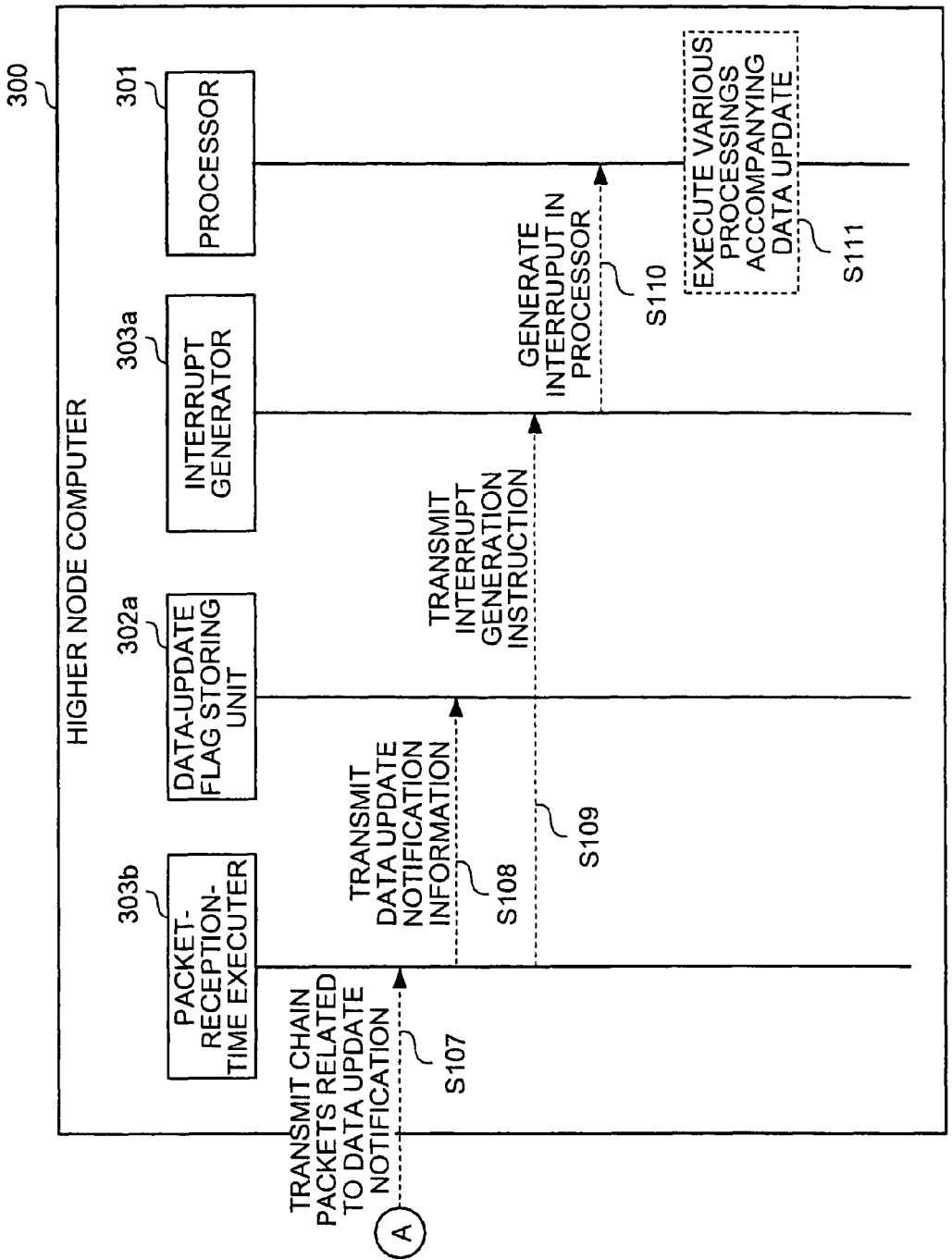
FIG. 8 is a second sequence chart of the dependent-data match processing performed among the node computers in the parallel computer system shown in FIG. 2.

The dependent-data match processing performed among the node computers in the parallel computer system shown in FIG. 2 will be explained with reference to FIGS. 7 and 8. As shown in FIGS. 7 and 8, in the lower node computer 100, the data update detector 103a detects data update (step S101). The data update detector 103a notifies the chain executer 103b of the detection of the data update (step S102). In response to the notification, the chain executer 103b reads the chain SWRs related to the data update notification from the storing unit 102 (step S103), and transmits corresponding chain packets related to the data update notification to the relay node computer 200 (step S104).

In the relay node computer 200, upon reception of the corresponding chain packets related to the data update notification, the packet-reception-time executer 203a outputs a data update notification to the chain executer 203b (step S105). The chain executer 203b, which has detected the data update notification, reads the chain SWRs related to the data update notification from the storing unit 202 (step S106), and transmits corresponding chain packets related to the data update notification to the higher node computer 300 (step S107).

In the higher node computer 300, upon reception of the corresponding chain packets related to the data update notification, the packet-reception-time executer 203a outputs a data update notification to the data-update-flag storing unit 302a to store the data update notification in the data-update-flag storing unit 302a (step S108). In addition, the packet-reception-time executer 203a outputs an interrupt generation instruction to the interrupt generator 303a (step S109). The interrupt generator 303a, which has detected the interrupt generation instruction generates an interrupt in the processor 301 (step S110). The processor 301 in which the interrupt is generated perform various processings accompanying the data update (step S111).

According to the first embodiment, a fine-out communication chain in which data is transmitted from one transmitting-side node computer to one receiving-side node computer is assumed. However, the present invention is not limited to the fine-out communication chain. Alternatively, the communication I/F 203 can further include a chain-execution determining unit. The chain-execution determining unit compares a start condition for execution of the chain SWRs stored in the storing unit 202 with a value of the data storing unit 202a after the packet-reception-time executer 203a has executed the memory operation in the data storing unit 202a based on an execution notification from the packet-reception-time executer 203a. If determining that they coincide, the chain-execution determining unit can output an instruction to read the chain SWRs and an instruction to execute corresponding atomic operations to the chain executer 203b. By so configuring, a fine-in communication chain in which the chain processing can be started by waiting for data synchronization after a plurality of data is input can be realized.

The "start condition for execution of chain SWRs" is set as a target value to be finally held in the data storing unit 102a. However, the present invention is not limited thereto. The number of times of receiving data necessary for the synchronous processing can be used as "start condition for execution of chain SWRs". The configuration can be such that the counted number of times of receiving data is stored in the data storing unit 102a, and if the counted number is equal to a predetermined value, the chain SWRs are executed.

In another alternative, the packet-reception-time executer 203a can include a function of turning on a processing flag when a packet related to the dependent-data match processing is received, and initializing the flag when the dependent-data match processing is finished. In this case, the packet-reception-time executer 203a can also include a function of ignoring the other packet that is received before the initialization, and transmitting an instruction to retry transmitting a packet to the transmitting-side node computer. By so configuring, the dependent data match processing can be performed under an exclusive control of not receiving the other packets.

In yet another alternative, the communication I/F 203 can further include a chain-indivisibility-instruction-execution-completion determining unit. The chain-indivisibility-instruction-execution-completion determining unit determines whether the chain executer 203b has read all the chain SWRs stored in the chain-SWR storing unit 202b, executed the corresponding atomic operations, and transmitted the corresponding packets. Furthermore, the communication I/F 203 can include an interrupt generator that generates an interrupt in the processor 201 of the relay node computer 200 to start a processing on the received data if the chain-indivisibility-instruction-execution-completion determining unit determines that the chain executer 203b has read all the chain SWRs stored in the chain-SWR storing unit 202b, executed the corresponding atomic operations, and transmitted the corresponding packets.

In still another alternative, the communication I/F 203 can further include a completion-notification transmitter that transmits a completion notification to the processor 201 of the relay node computer 200 to start the processing on the received data if the chain-indivisibility-instruction-execution-completion determining unit determines that the chain executer 203b has read all the chain SWRs stored in the chain-SWR storing unit 202b and executed the corresponding atomic operations.

In still another alternative, the communication I/F 203 can further include a communication-processing executer that executes a predetermined communication processing on the transmitting-side node computer if the chain-indivisibility-instruction-execution-completion determining unit determines that the chain executer 203b has read all the chain SWRs stored in the chain-SWR storing unit 202b and executed the corresponding atomic operations.

In still another alternative, the chain executer 203b can perform a memory operation even in response to the reception of the packet from the relay node computer 200 including the communication I/F 203, and designate SWRs associated with the received data while referring to the data storing unit 202a.

Figure 9:
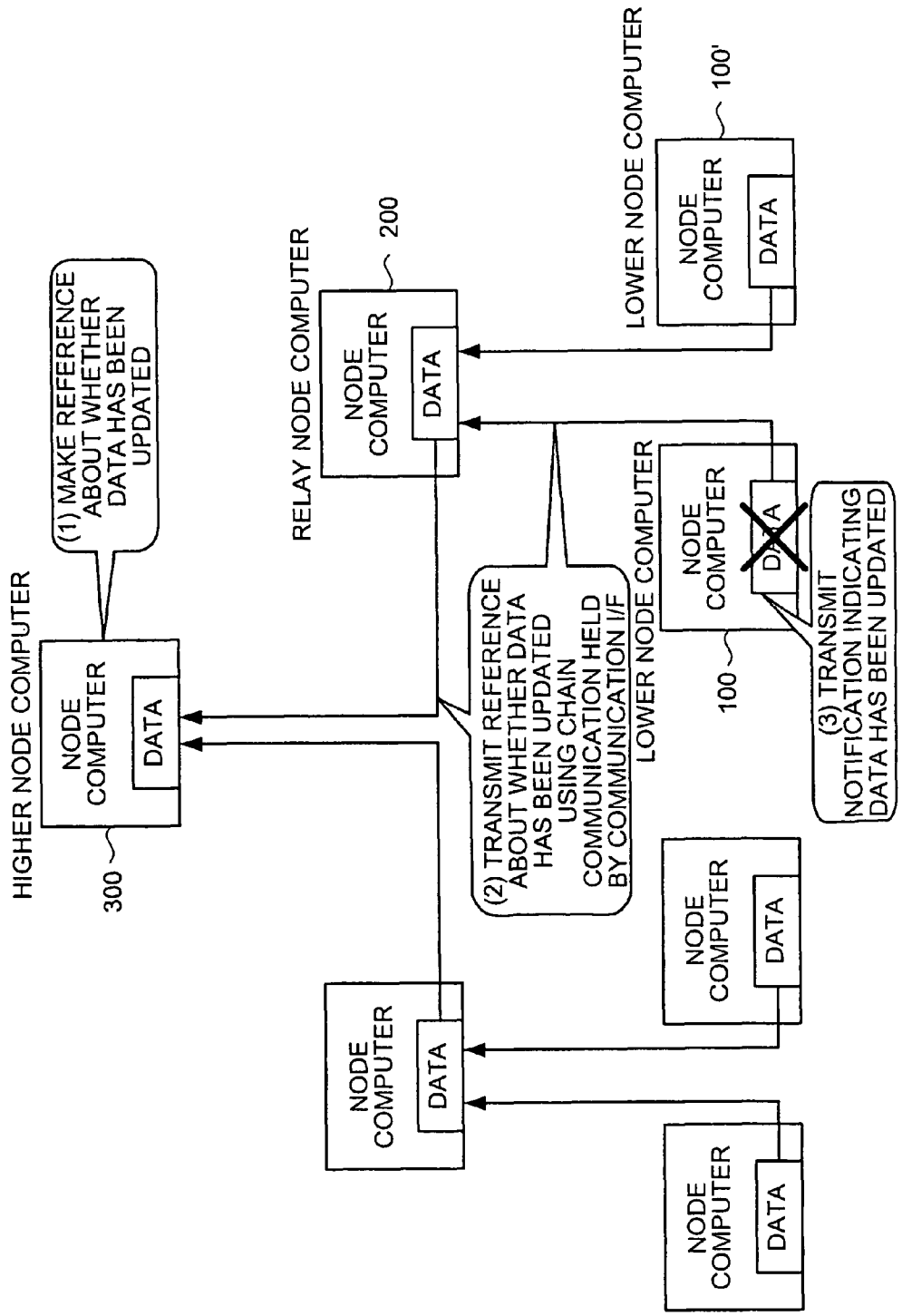
FIG. 9 is a schematic for explaining features of a dependent-data match processing performed among node computers in a parallel computer system according to a second embodiment of the present invention.

A dependent-data match processing performed among node computers in a parallel computer system according to a second embodiment will be explained. In the dependent-data match processing according to the second embodiment, the higher node computer makes a reference to all the lower node computers about whether dependent data has been updated. FIG. 9 is a schematic for explaining features of the dependent-data match processing performed among the node computers in the parallel computer system according to the second embodiment. In FIG. 9, lower node computers 100 and 100' serve as lowest node computers, the relay node computer 200 serves as a relay node computer, and the higher node computer 300 serves as the highest node computer. The respective node computers in the parallel computer system shown in FIG. 9 have the data dependency relationship with one another in the multi-tree structure.

In FIG. 9, similarly to FIGS. 1 and 2, data arranged in the higher node computer 300 depends on data arranged in the relay node computer 200 adjacent to the higher node computer 300 under the dependency relationship in the multi-tree structure. The data arranged in the relay node computer 200 depends on data arranged in the lower node computer 100 adjacent to the relay node computer 200 under the dependency relationship in the multi-tree structure. Namely, the data arranged in the higher node computer 300 depends on the data arranged in the relay node computer 200 and the lower node computer 100 that are lower than the higher node computer 300.

The higher node computer 300 at the highest level makes a reference to the lower relay node computer 200 adjacent to the higher node computer 300 about whether data has been updated as shown in (1) of FIG. 9. The data arranged in the relay node computer 200 adjacent to the higher node computer 300 depends on the data arranged in the lower node computer 100. The reference about whether the data has been updated in the relay node computer 200 or the lower node computer 100 is transmitted from the higher node computer 300 to the lower relay node computer 200 adjacent to the higher node computer 300 and further from the higher node computer 300 to the lower node computer 100 adjacent to the higher node computer 300 at "low cost" using chain communication held by the communication I/F included in each of the node computers as shown in (2) of FIG. 9.

Furthermore, if data has been updated in the relay node computer 200 or the lower node computer 100 (the lower node computer 100 in FIG. 9), a notification of data update is transmitted to the higher node computer 300 by the method explained according to the first embodiment.

The meaning of the "low cost" is as follows. According to the second embodiment, similarly to the first embodiment, the reference about whether the dependent data has been updated is transmitted from the higher node computer to the lower node computer arranged to be distributed in the parallel computer system using the chain communication held by the communication I/F included in each of the node computers.

If the node computers in the parallel computer system hold communication using the chain communication held by the communication I/F included in each node computer, overhead can be suppressed despite the dependency relationship of data in the multi-tree structure/topology. The overhead is generated when the highest node computer transmits the reference about whether the dependent data has been updated to the lowest node computer via a plurality of relay node computers.

If the internode communication is used to transmit the reference about whether the dependent data has been updated, then an interrupt occurs in a processor of each node computer whenever a packet is transmitted or received and the standby processing for receiving the packet provokes a disturbance in a context switch of the processor. This causes deceleration of a communication rate at which the node computers communicate with one another. According to the second embodiment, similarly to the first embodiment, the internode communication is not used, so that these disadvantages do not occur. It is, therefore, possible to prevent deterioration in performances of the parallel computer system and make most use of the performances of the parallel computer system without decelerating the communication rate at which the node computers hold communication with one another. This situation is expressed as the "low cost".

According to the second embodiment, the reference about whether the dependent data has been updated is transmitted to all the adjacent lower node computers. In FIG. 9, a situation in which the reference about whether the dependent data has been updated is transmitted from the higher node computer 300 to the lower node computers 100 and 100' via the relay node computer 200 for brevity of explanation.

Figure 10:
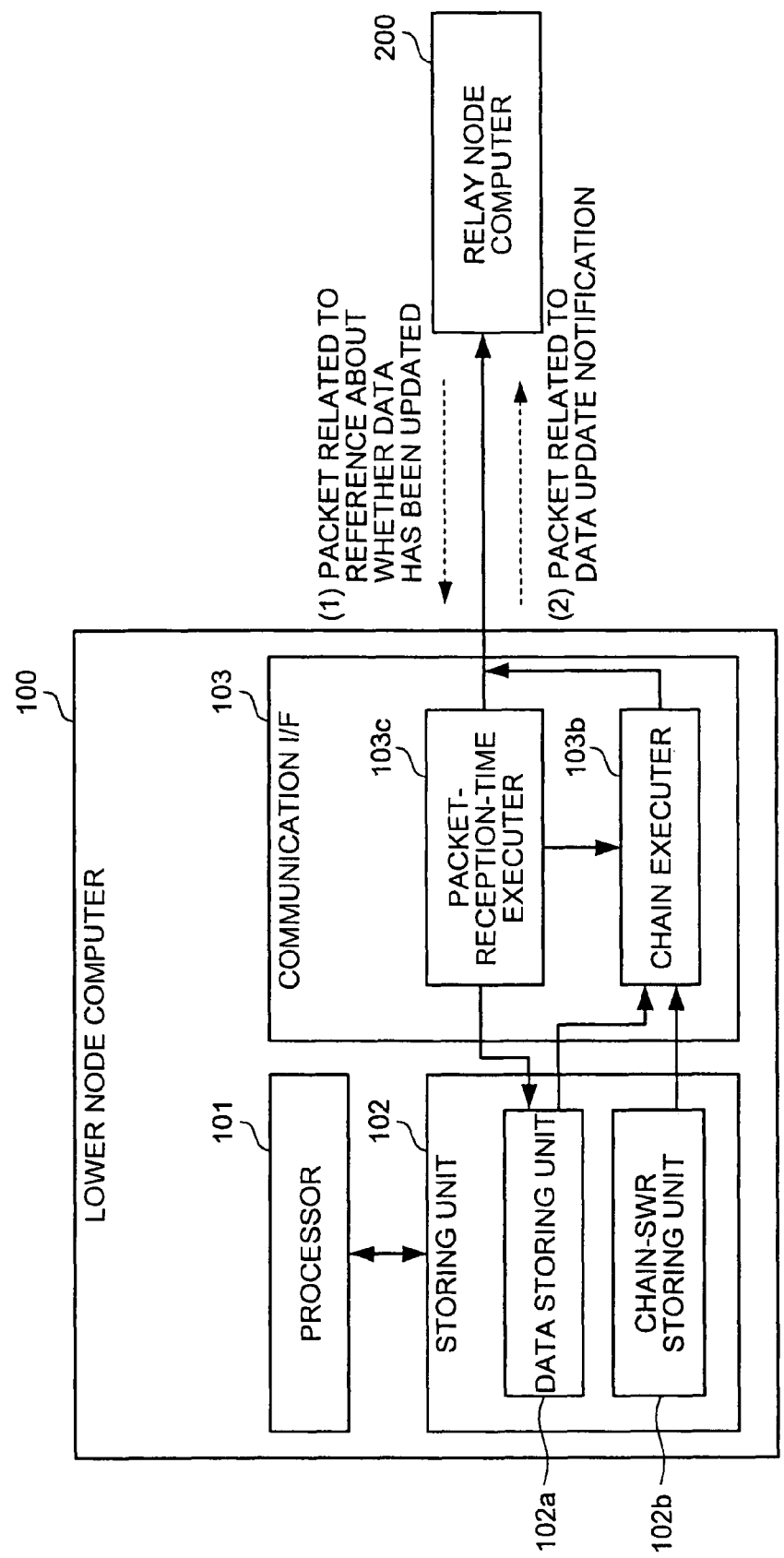
FIG. 10 is a functional block diagram of a configuration of a lower node computer in the parallel computer system shown in FIG. 9.

A configuration of the lower node computer 100 in the parallel computer system shown in FIG. 9 will be explained with reference to FIG. 10. The lower node computer 100, the relay node computer 200, and the higher node computer 300 include identical functional blocks. Functional blocks other than those characteristic of the lower node computer 100 shown in FIG. 10 will not be explained herein. As shown in FIG. 10, the lower node computer 100 includes the processor 101 that controls entirety of the lower node computer 100, the storing unit 102, and the communication I/F 103 that is a network interface card.

The storing unit 102 includes the data storing unit 102a such as a memory that is a storage area for storing data, and the chain-SWR storing unit 102b that stores therein the chain SWRs. If the chain SWRs are output, all the associated SWRs are output in order. A packet in response to each of the output SWRs is transmitted to the outside.

According to the second embodiment, the packet transmitted or received includes not only data on which a corresponding atomic operation is executed but also pointer information indicating addresses where the chain SWRs to be executed are stored in the chain-SWR storing unit 102b. The data storing unit 102a stores therein not only the data on which the corresponding atomic operation is performed but also the pointer information indicating a top address of the addresses where the chain SWRs to be executed are stored in the chain-SWR storing unit 102b.

The communication I/F 103 includes a packet-reception-time executer 103c and the chain executer 103b. Upon reception of a packet related to the reference about whether data has been updated and transmitted from the higher node computer 300 to the lower node computer 100 via the relay node computer 200 as shown in (1) of FIG. 10, the packet-reception-time executer 103c executes a memory operation corresponding to the received packet in the data storing unit 102a. Furthermore, the packet-reception-time executer 103c instructs the chain executer 103b to execute the chain atomic operations.

If the chain executer 103b is instructed to execute the chain atomic operations by the packet-reception-time executer 103c, the chain executer 103b reads the pointer information indicating the top address of the addresses where the chain SWRs to be executed are stored, from the data storing unit 102a. Furthermore, the chain executer 103b reads the first SWR stored at the address indicated by the pointer and executes a corresponding atomic operation. Next, the chain executer 103b reads the second SWR from the pointer indicating the address where the second SWR to be executed next to the first SWR is stored to accompany the first SWR stored in the chain-SWR storing unit 102b, and executes a corresponding atomic operation. The chain processings are repeated as long as the pointer information indicating an address where an SWR to be executed next is stored, is stored. As a consequence, if one packet is received from the outside, then the chain SWRs are sequentially read by functions of the communication I/F 103, and the corresponding atomic operations are executed.

Specifically, in response to reception of the packet from the relay node computer 200, the chain SWRs are output. If the SWRs indicate, in particular, the notification of the data update as shown in (2) of FIG. 10, a packet related to the notification of the data update is transmitted to the relay node computer 200.

It is to be noted that the packet-reception-time executer 103c can receive not only the packets from the other node computer, but also those from the lower node computer 100 including the packet-reception-time executer 103c. This is based on the fact that the packet-reception-time executer 103c can transmit packets to the lower node computer 100.

Furthermore, the address of the memory area for which the operation is designated by the received packet is a virtual address. The communication I/F 103, therefore, includes a function of converting the virtual address into an actual address. The packet-reception-time executer 103c outputs an instruction to cause the chain executer 103b to execute the chain processings related to the data reception, to the chain executer 103b. The chain executer 103b transmits a corresponding packet to the other node computer in response to the instruction to transmit the packet to the other node computer.

A configuration of the relay node computer 200 in the parallel computer system shown in FIG. 9 will be explained with reference to FIG. 11. Functional blocks other than those characteristic of the relay node computer 200 shown in FIG. 11 will not be explained herein.

The relay node computer 200 includes the processor 201 such as a CPU, the storing unit 202, and the communication I/F 203 that is a network interface card. The storing unit 202 includes a chain-processing-execution-condition storing unit 202c, the data storing unit 202a such as a memory that is a storage area for storing data, and the chain-SWR storing unit 202b that stores therein the chain SWRs. The chain-processing-execution-condition storing unit 202c stores therein a condition for executing the chain processings.

The communication I/F 203 includes the packet-reception-time executer 203a, the chain executer 203b, and a chain-processing-execution-condition determining unit 203c. Upon reception of a packet related to the reference about whether data has been updated from the higher node computer 300, the packet-reception-time executer 203a executes a memory operation corresponding to the received packet in the data storing unit 202a. Furthermore, the packet-reception-time executer 203a instructs the chain executer 203b to execute the chain atomic operations.

First of all, the chain executer 203b reads the pointer information indicating the top address of the addresses where the chain SWRs to be executed are stored, from the data storing unit 202a, reads the first SWR stored at the address indicated by the pointer, and executes a corresponding atomic operation based on a chain-processing-execution instruction from the chain-processing-execution-condition determining unit 203c. Next, the chain executer 203b reads the second SWR from the pointer indicating the address where the second SWR to be executed next to the first SWR is stored to accompany the first SWR in the chain-SWR storing unit 202b, and executes a corresponding atomic operation. The chain processings are repeated as long as the pointer information indicating an address where an SWR to be executed next is stored, is stored. As a consequence, if one packet is received from the outside, then the chain SWRs is sequentially read by functions of the communication I/F 203, the corresponding atomic operations are executed, and corresponding packets are transmitted. Specifically, the relay node computer 200 transmits chain packets to the lower node computers 100 and 100' (see "a packet related to the reference about whether data has been updated and transmitted to the lower node computer 100 as shown in (2) of FIG. 11" and "a packet related to the reference about whether data has been updated and transmitted to the lower node computer 100' as shown in (2') of FIG. 11").

The chain-processing-execution-condition determining unit 203c reads a value of the data storing unit 202a after the packet-reception-time executer 203a has executed the memory operation in the data storing unit 202a. The chain-processing-execution-condition determining unit 203c compares a chain-processing-execution condition from the chain-processing-execution-condition storing unit 202c with the memory value based on a notification from the packet-reception-time executer 203a that the atomic operation has been executed. If determining that they coincide, the chain-processing-execution-condition determining unit 203c outputs an instruction to execute the chain processings to the chain executer 203b, and an instruction to transmit a completion notification to all the node computers that have transmitted packets based on the memory operation to the chain executer 203b.

Figure 11:
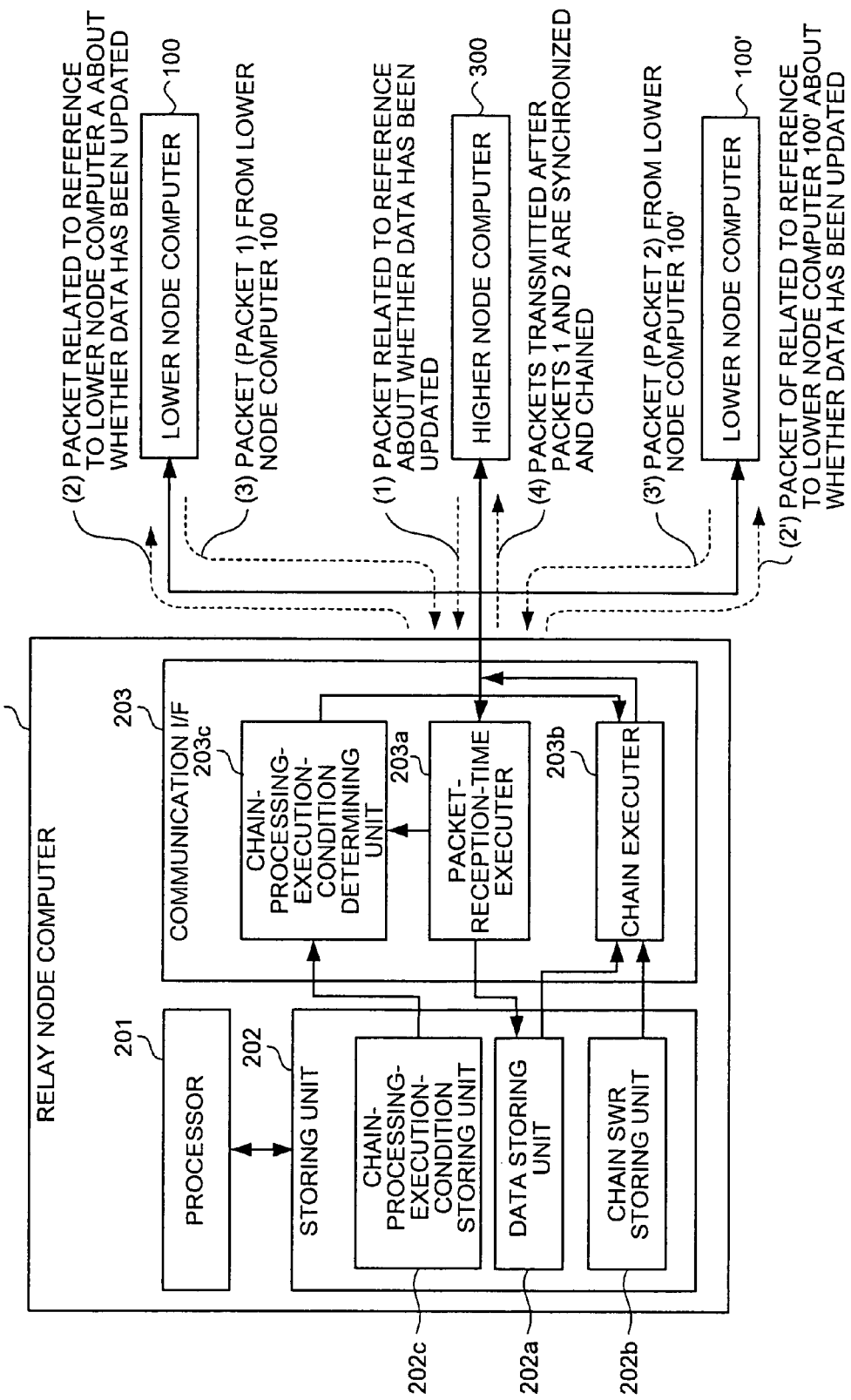
FIG. 11 is a functional block diagram of a configuration of a relay node computer in the parallel computer system shown in FIG. 9.

Specifically, the chain-processing-execution-condition determining unit 203c performs a processing for waiting for synchronization of a packet (packet 1) from the lower node computer 100 as shown in (3) of FIG. 11 with a packet (packet 2) from the lower node computer 100' as shown in (3') of FIG. 11.

Moreover, if the chain-processing-execution-condition determining unit 203c completes the processing for waiting for synchronization, the chain executer 203b transmits a packet according to an SWR output to be linked to completion of the waiting for synchronization of the packets 1 and 2 to the higher node computer 300.

According to the second embodiment, the "chain-processing-execution condition" is set as a target value to be finally held in the data storing unit 202a. Furthermore, "the value of the data storing unit 202a after the memory operation" is set as the value stored in the data storing unit 202a itself. However, the present invention is not limited thereto. The number of times of receiving data necessary to start execution of the chain processings can be used as the "chain-processing-execution condition", and the counted number of times of receiving data can be used as the "value of the data storing unit 202a after the memory operation".

Moreover, the chain-processing-execution-condition storing unit 202c is not necessarily arranged in the storing unit 202 but can be arranged in a predetermined storage area in the communication I/F 203.

The notification indicating execution of the atomic operation from the packet-reception-time executer 203a is a kind of the atomic operation. Likewise, the notification indicating execution of the comparison of the chain-processing-execution condition with the value of the data storing unit 202a after the memory operation is also a kind of the atomic operation. Furthermore, the instruction to execute the chain processings to be output to the chain executer 203b if it is determined that the chain-processing-execution condition coincides with the value of the data storing unit 202a after the memory operation is a kind of the atomic operation. These atomic operations are those newly added to the communication I/F 203 according to the second embodiment.

Upon reception of a packet related to the reference about whether data has been updated from the other node computer, the packet-reception-time executer 203a executes an atomic operation corresponding to the packet and directly performs a memory operation in the data storing unit 202a. If the relay node computer 200 receives a packet related to one processing for the reference about whether data has been updated from the other node computer for the first time, the packet-reception-time executer 203a manages information indicating that a processing for the reference about whether data has been updated using a flag or the like indicating that the processing for the reference about whether data has been updated is being performed. If the notification indicating execution of the atomic operation is output, the packet-reception-time executer 203a initializes the flag or the like to make the end of the processing for the reference about whether data has been updated recognizable. In this case, the packet-reception-time executer 203a can also include a function of ignoring the other packet that is received before the initialization, and transmitting an instruction to retry transmitting a packet to the transmitting-side node computer. By so configuring, an exclusive control of not receiving the other packets during the reference about whether data has been updated can be performed. In this manner, the packet-reception-time executer 203a can perform the exclusive control of not performing the other processing while one processing for the reference about whether data has been updated is being performed.

It is to be noted that the packet-reception-time executer 203a can receive not only packets from the other node computer, but also those from the relay node computer 200 including the packet-reception-time executer 203a. This is based on the fact that the packet-reception-time executer 203a can transmit packets to the relay node computer 200.

Furthermore, the address of the memory area for which the operation is designated by the received packet is a virtual address. The communication I/F 203, therefore, includes a function of converting the virtual address into an actual address. The packet-reception-time executer 203a outputs an instruction to cause the chain executer 203b to execute the chain processings related to the data reception, to the chain executer 203b. The chain executer 203b transmits a corresponding packet to the other node computer in response to the instruction to transmit the packet to the other node computer.

A configuration of the higher node computer 300 in the parallel computer system shown in FIG. 9 will be explained with reference to FIG. 12. Functional blocks other than those characteristic of the higher node computer 300 shown in FIG. 12 will not be explained herein.

As shown in FIG. 12, the higher node computer 300 includes the processor 301 such as a CPU, the storing unit 302, and the communication I/F 303 that is a network interface card. The storing unit 302 includes the data-update-flag storing unit 302a that stores therein the notification indicating the update of data in the lower node computer 100 or the relay node computer 200 using a data-update flag, and the data storing unit 302b that is an area in which data including a received packet is written. The communication I/F 303 includes the interrupt generator 303a and an atomic operation executer 303c.

The interrupt generator 303a generates an interrupt or an event in the processor 301 based on an interrupt-processing generation instruction from the atomic operation executer 303c. The atomic operation executer 303c transmits a packet related to the reference about whether data has been updated to the relay node computer 200 as shown in (1) of FIG. 12. Furthermore, the atomic operation executer 303c receives a packet related to the data update notification from the relay node computer 200 as shown in (2) of FIG. 12. The atomic operation executer 303c executes an atomic operation corresponding to the received packet and turns on the data-update flag stored in the data-update-flag storing unit 302a.

It is to be noted that the atomic operation executer 303c can receive not only packets from the other node computer, but also those from the higher node computer 300 including the atomic operation executer 303c. This is based on the fact that the atomic operation executer 303c can transmit packets to the higher node computer 300.

Furthermore, the address of the memory area for which the operation is designated by the received packet is a virtual address. The communication I/F 303, therefore, includes a function of converting the virtual address into an actual address. The packet-reception-time executer 303b outputs an instruction to cause the interrupt generator 303a to generate an interrupt processing related to the data reception, to the interrupt generator 303a.

In this manner, in the lower node computers 100 and 100', the relay node computer 200, and the higher node computer 300 according to the second embodiment, a transmission processing for transmitting the reference about whether dependent data has been updated in the lower node computer 100 from the higher node computer 300 to the lower computers 100 and 100' via the relay node computer 200 is performed only using the communication I/Fs 103, 203, and 303. Conventionally, the transmission processing is performed by the processors 101, 201, and 301. According to the second embodiment, it is possible to suppress a disturbance in the context switch of each processor caused by the interrupt generated whenever a packet is received and by a synchronous processing. Namely, according to the second embodiment, the generation of the interrupt whenever a packet related to the processing for the reference about whether data has been updated is received can be suppressed. Furthermore, the transmission processing is handed over from software control performed by each processor to a hardware processing performed by each communication I/F. It is, therefore, possible to suppress the disturbance in the context switch of each processor, increase the communication rate at which the node computers communicate with one another in the parallel computer system, and improve processing capabilities of the parallel computer system.

The dependent-data match processing performed among the node computers in the parallel computer system shown in FIG. 9 will be explained with reference to FIGS. 13 and 14. As shown in FIGS. 13 and 14, in the higher node computer 300, the atomic operation executer 303c transmits the packet related to the reference about whether data has been updated to the relay node computer 200 (step S111). In the relay node computer 200, when the packet-reception-time executer 203a receives the packet related to the reference about whether data has been updated from the higher node computer 300, the packet-reception-time executer 203a notifies the chain executer 203b of the reference about whether data has been updated (step S112). In response to the notification, the chain executer 203b reads chain SWRs related to the reference about whether data has been updated from the storing unit 202 (step S113), and transmits corresponding chain packets related to the reference about whether data has been updated to the lower node computer 100 (step S114).

In the lower node computer 100, upon reception of the corresponding chain packets related to the reference about whether data has been updated, the packet-reception-time executer 103c notifies the chain executer 103b of the notification indicating the reference about whether data has been updated (step S115). The chain executer 103b reads chain SWRs related to the notification indicating the reference about whether data has been updated from the storing unit 102 (step S116), and determines whether the dependent data stored in the storing unit 102 has been updated (step S117). It is to be noted that the lower node computer 100' similarly performs the processing at the steps S114 to S117. If it is determined at the step S117 that the data stored in the storing unit 102 has been updated, the notification indicating update of the dependent data explained according to the first embodiment is transmitted from the lower node computer 100 to the higher node computer 300 via the relay node computer 200.

According to the first and the second embodiments, the number of node computers connected to one another in the parallel computer system is limited to a specific number for brevity of explanation. However, as long as the node computers can be connected in the tree structure, the number of node computers can exceed that explained in the first and second embodiments.

Moreover, the communication I/Fs 103, 203, and 303 according to the first and the second embodiments are compatible with conventional communication I/Fs to serve as communication mechanisms. Therefore, the node computer that includes the communication I/F 103, 203 or 303 can be connected to a node computer that does not include the communication I/F 103, 203 or 303. The node computer that does not include the communication I/F 103, 203 or 303 has disadvantages of deterioration in communication performances. For example, an interrupt in a processor related to the inter-node communication and a disturbance in a context switch of the processor occur to the node computer that does not include the communication I/F 103, 203 or 303. The node computer that does not include the communication I/F 103, 203 or 303 has no other disadvantages. Namely, a mixture of the node computers that include the communication I/F 103, 203 or 303 and the node computers that do not include the communication I/F 103, 203 or 303 can be arranged to constitute a parallel computer system.

As described above, according to an embodiment of the present invention, it is advantageously possible to suppress the overhead generated when the node computers in the parallel computer system communicate with one another, and prevent deterioration in the performances of the parallel computer system.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication interface device of a node computer in a parallel computer system, the communication interface device comprising:
    a first storing unit that stores therein a plurality of indivisibility instructions, each indivisibility instruction of the indivisibility instructions being associated with one another in order and being chained using an address that indicates a next chained indivisibility instruction;
    a detecting unit that detects a change of first data by receiving a notification of the change of the first data from a lower node computer, the first data being stored in the lower node computer, second data that is dependent on the first data being stored in the node computer, the change of first data being made by the lower node computer;
    a first designating unit that stores location information of an indivisibility instruction associated with the first data among the indivisibility instructions, and designates, when the detecting unit detects the change in the first data, the indivisibility instruction by the location information;
    a first executing unit that transmits a communication packet from the node computer to a higher node computer by executing the indivisibility instruction designated by the first designating unit, and transmits another communication packet than the communication packet from the node computer to a higher node computer by executing the next chained indivisibility instruction based on the address that indicates a next chained indivisibility instruction, the communication packet indicating the change of the first data; and
    a second storing unit that stores therein information on invalidation of the second data that is dependent on the first data, based on the notification of the change of the first data received from the lower node computer.

2. The communication interface device according to claim 1, further comprising:
    a generating unit that generates, when it is determined that the first executing unit has executed all chained indivisibility instructions stored in the first storing unit, an interrupt in a processor of the node computer for starting a processing after reception of the notification of the change.

3. The communication interface device according to claim 1, further comprising:
    an output unit that outputs, when it is determined that the first executing unit has executed all chained indivisibility instructions stored in the first storing unit, a completion notification to a processor of the node computer for starting a processing after reception of the notification of the change.

4. The communication interface device according to claim 1, further comprising:
- a second executing unit that executes, when it is determined that the first executing unit has executed all chained indivisibility instructions stored in the first storing unit, a communication processing defined in advance for the lower node computer.

5. The communication interface device according to claim 1, further comprising:
- an inquiring unit that inquires whether there is a change of first data that is distributed to the lower node computer on which the second data that belongs to the higher node computer is dependent.

6. The communication interface device according to claim 5, further comprising:
- a second designating unit that designates an indivisibility instruction corresponding to an inquiry from the higher node computer about the change of the first data, by referring to the first storing unit; and
- a second executing unit that executes the indivisibility instruction designated by the second designating unit, and further executes the chained indivisibility instruction corresponding to the indivisibility instruction designated by the second designating unit.

7. The communication interface device according to claim 5, further comprising:
- a notifying unit that notifies the change of the first data in response to the inquiry from the higher node computer to the higher node computer.

8. The communication interface device according to claim 1, further comprising:
- a third storing unit that stores data reception information indicating that data has been received from a lower node computer; and
- an initializing unit that initializes, when it is determined that the first executing unit has executed all chained indivisibility instructions stored in the first storing unit, the data reception information stored in the third storing unit.

9. The communication interface device according to claim 8, further comprising:
- a stopping unit that stops, when data is further received from the lower node computer before the initializing unit initializes the data reception information, the first designating unit from performing a memory operation and designating the indivisibility instruction; and
- a transmitting unit that transmits information indicating that the stopping unit has stopped the first designating unit from performing the memory operation and designating the indivisibility instruction.

10. The communication interface device according to claim 9, further comprising:
- a retrying unit that retries, when the information that indicates that the stopping unit has stopped the first designating unit from performing the memory operation and designating the indivisibility instruction is received from a receiving-side node computer, a transmission of the data to a receiving-side node computer.

11. The communication interface device according to claim 1, further comprising:
- a generating unit that generates, when the second storing unit stores the information on the invalidation of the second data based on the notification of the change of the first data, an interrupt in a processor of the node computer for starting a processing after the reception of the notification of the change.

12. A communication method for a communication interface device of a node computer in a parallel computer system, the communication method comprising:
- first storing a plurality of indivisibility instructions, each indivisibility instruction of the indivisibility instructions being associated with one another in order and being chained using an address that indicates a next chained indivisibility instruction;
- detecting a change of first data by receiving a notification of the change of the first data from a lower node computer, the first data being stored in the lower node computer, second data that is dependent on the first data being stored in the node computer, the change of first data being made by the lower node computer;
- second storing location information of an indivisibility instruction associated with the first data among the indivisibility instructions;
- first designating, when the change in the first data is detected, the indivisibility instruction by the location information;
- transmitting a communication packet from the node computer to a higher node computer by executing the indivisibility instruction designated at the first designating, and transmitting another communication packet than the communication packet from the node computer to a higher node computer by executing the next chained indivisibility instruction based on the address that indicates a next chained indivisibility instruction, the communication packet indicating the change of the first data; and
- third storing information on invalidation of the second data that is dependent on the first data, based on the notification of the change of the first data received from the lower node computer.

13. The communication method according to claim 12, further comprising:
- generating, when it is determined that all chained indivisibility instructions stored at the first storing is executed at the transmitting, an interrupt in a processor of the node computer for starting a processing after reception of the notification of the change.

14. The communication method according to claim 12, further comprising:
- outputting, when it is determined that all chained indivisibility instructions stored at the first storing is executed at the transmitting, a completion notification to a processor of the node computer for starting a processing after reception of the notification of the change.

15. The communication method according to claim 12, further comprising:
- executing, when it is determined that all chained indivisibility instructions stored at the first storing is executed at the transmitting, a communication processing defined in advance for the lower node computer.

16. The communication method according to claim 12, further comprising:
- inquiring whether there is a change of first data that is distributed to the lower node computer on which the second data that belongs to the higher node computer is dependent.

17. The communication method according to claim 16, further comprising:
- second designating including designating an indivisibility instruction corresponding to an inquiry from the higher node computer about the change of the first data, by referring to the stored chained indivisibility instruction; and transmitting including executing the indivisibility instruction designated at the second designating, and further executes the chained indivisibility instruction corresponding to the indivisibility instruction designated by the second designating.

18. The communication method according to claim 16, further comprising:
notifying the change of the first data in response to the inquiry from the higher node computer to the higher node computer.

19. The communication method according to claim 12, further comprising:
fourth storing data reception information indicating that data has been received from a lower node computer; and
initializing, when it is determined that all chained indivisibility instructions stored at the first storing is executed at the transmitting, the data reception information stored at the fourth storing.

20. The communication method according to claim 19, further comprising:
stopping, when data is further received from the lower node computer before the data reception information is initialized at the initializing, the first designating from performing a memory operation and designating the indivisibility instruction; and
transmitting information indicating that the first designating is stopped.

21. The communication method according to claim 20, further comprising:
retrying, when the information that indicates that the first designating is stopped is received from a receiving-side node computer, a transmission of the data to a receiving-side node computer.

22. The communication method according to claim 12, further comprising:
generating, when the information on the invalidation of the second data is stored at the third storing based on the notification of the change of the first data, an interrupt in a processor of the node computer for starting a processing after the reception of the notification of the change.

* * * * *

UNITED STATES PATENT AND TRADEMARK OFFICE
CERTIFICATE OF CORRECTION

| | | |
|---|---|---|
| PATENT NO. | : 7,877,574 B2 | Page 1 of 1 |
| APPLICATION NO. | : 11/790662 | |
| DATED | : January 25, 2011 | |
| INVENTOR(S) | : Nobutaka Imamura | |

It is certified that error appears in the above-identified patent and that said Letters Patent is hereby corrected as shown below:

Title Page, item (56);
Column 2 (Foreign Patent Documents), Line 4 delete "9-10673" and insert -- 9-106373 --, therefor.

Signed and Sealed this
Fifth Day of April, 2011

David J. Kappos
*Director of the United States Patent and Trademark Office*